US012329708B1

(12) United States Patent
Lin

(10) Patent No.: US 12,329,708 B1
(45) Date of Patent: Jun. 17, 2025

(54) HANDHELD ROLLER

(71) Applicant: Suge Lin, Lufeng (CN)

(72) Inventor: Suge Lin, Lufeng (CN)

( * ) Notice: Subject to any disclaimer, the term of this patent is extended or adjusted under 35 U.S.C. 154(b) by 0 days.

(21) Appl. No.: 18/820,335

(22) Filed: Aug. 30, 2024

(51) Int. Cl.
*A61H 15/00* (2006.01)

(52) U.S. Cl.
CPC . *A61H 15/0092* (2013.01); *A61H 2015/0014* (2013.01)

(58) Field of Classification Search
CPC .... A61H 2015/0014; A61H 2015/0007–0057; A61H 15/0092; A61H 15/0085; A61H 15/00; A61H 15/02; A61H 15/0078; A61H 2201/0153; A61H 2201/1253; A61H 2201/1671; A61H 2205/065; A63B 23/16; A63B 23/00; A63B 22/20
See application file for complete search history.

(56) References Cited

U.S. PATENT DOCUMENTS 3,645,256 A * 2/1972 Morrison ............... A61H 15/00 D21/684
3,779,548 A * 12/1973 Sato ....................... A63B 23/16 482/44
D418,227 S * 12/1999 O'Connor .................... D24/212
2016/0129302 A1* 5/2016 Vallo .................... A61H 1/0292 482/132
2017/0156968 A1* 6/2017 Bymers .................. A61H 15/00
2018/0104139 A1* 4/2018 Guy ................... A61H 15/0092
2019/0038499 A1* 2/2019 Horowitz ............... A61H 15/00
2020/0375843 A1* 12/2020 Desjardins ............. A61H 15/02
2024/0342561 A1* 10/2024 Chen ...................... A61H 7/001
2024/0358585 A1* 10/2024 Wu .................... A61H 15/0092

* cited by examiner

*Primary Examiner* — Victoria Murphy
*Assistant Examiner* — Sara K Toich

(57) ABSTRACT

A handheld roller includes at least two roller assemblies, two end covers and a connecting shaft. The roller assemblies have first ends and second ends, and the first ends and the second ends of the roller assemblies are both provided with connecting portions. The end covers are provided with rotating shaft holes, one end cover is covered at the first end of each roller assembly, and the other end cover is covered at the second end of each roller assembly. A connecting end of the connecting shaft passes through the rotating shaft holes and is connected with the connecting portions, a free end of the connecting shaft abuts against the position that the end covers are close to the rotating shaft holes, and the connecting shaft and the roller assemblies form a whole.

17 Claims, 7 Drawing Sheets

HANDHELD ROLLER

TECHNICAL FIELD

The present disclosure relates to the technical field of decompression toys, and in particular to a handheld roller.

BACKGROUND

With the faster and faster pace of people's life and higher and higher stress, people like to use a decompression toy to release their stress, in particular some users feeling restless due to stress adopt the decompression toy to achieve the non-destructive hyperactivity, which will not affect others while releasing stress. However, there are many kinds of decompression toys, including a finger spinner, a decompression cube and a handheld roller toy, and the handheld roller is especially popular due to its convenient use and good silence.

Currently, the existing handheld roller toy on the market usually has a plurality of rollers, end covers, screws, nuts and the like, the screws pass through the end covers and the rollers and are connected with the nuts, such that the screws, nuts and end covers form an integrated support, the rollers are allowed to rotate in relative to the support, and users can hold the handheld roller toy in hands to overturn the product and rotate the rollers repeatedly. However, this kind of product needs to use the relatively long screws to implement connection, on the one hand, the product weight will be increased, and on the other hand, the screws are difficultly positioned after passing through the rollers due to the relatively long length, so the screws are directly connected with the nuts, with a low product assembly efficiency.

Therefore, the present disclosure provides a handheld roller, which can effectively solve the foregoing problem, and has a simple structure, a light weight and a high product assembly efficiency.

SUMMARY

In order to overcome the shortcomings of the prior art, the present disclosure provides a handheld roller which has a simple structure, a light weight and a high product assembly efficiency.

The technical solution adopted by the present disclosure to solve the technical problem is as follows.

A handheld roller, includes:

at least two roller assemblies, wherein the roller assemblies have first ends and second ends, and the first ends and the second ends of the roller assemblies are both provided with connecting portions;

two end covers, wherein the end covers are provided with rotating shaft holes, one end cover is covered at the first end of each roller assembly, and the other end cover is covered at the second end of each roller assembly;

a connecting shaft, wherein a connecting end of the connecting shaft passes through the rotating shaft holes and is connected with the connecting portions, a free end of the connecting shaft abuts against the position that the end covers are close to the rotating shaft holes, and the connecting shaft and the roller assemblies form a whole; and when the roller assemblies rotate around axes thereof under the drive of an external force, both the roller assemblies and the connecting shaft rotate in relative to the end covers.

As an improvement of the present disclosure, the handheld roller further includes bearings, the roller assemblies are provided with bearing grooves that are disposed around the connecting portions, the bearings are plugged into the bearing grooves, and outer surfaces of the bearings abut against one sides of the end covers that face the roller assemblies.

As an improvement of the present disclosure, the connecting portions extend upward along through holes in the middles of the bearings, and the lengths of the connecting portions are roughly equivalent to the thicknesses of the bearings.

As an improvement of the present disclosure, one sides of the end covers that face the roller assemblies are provided with limiting grooves, and upper parts of the bearings are plugged into the limiting grooves.

As an improvement of the present disclosure, the roller assemblies include rollers and two connectors, first ends and second ends of the rollers are both provided with mounting holes, the two connectors are mounted in the mounting holes in a manner of interference fit, the connecting shaft is connected with the connectors, and both the connecting portions and the bearing grooves are disposed on one sides of the connectors that deviate from the rollers.

As an improvement of the present disclosure, the connecting end of the connecting shaft is in threaded connection with the connecting portions.

As an improvement of the present disclosure, the the free end of the connecting shaft is provided with an abutting block, one sides of the end covers that are away from the roller assemblies are provided with accommodating grooves along edges of the rotating shaft holes, and the abutting block abuts against inner walls of the accommodating grooves.

As an improvement of the present disclosure, an end face outside the abutting block is roughly flush with end faces outside the end covers.

As an improvement of the present disclosure, surfaces of the end faces outside the end covers are provided with convex and concave grains.

As an improvement of the present disclosure, a gap is formed between outer surfaces of the two adjacent roller assemblies, and a width of the gap is not greater than 1 CM.

As an improvement of the present disclosure, axes of the two adjacent roller assemblies are roughly parallel to each other.

As an improvement of the present disclosure, outer surfaces of the rollers are provided with a plurality of bumps.

As an improvement of the present disclosure, the bumps are evenly arranged on the surfaces of the rollers along circumferential directions of the rollers.

As an improvement of the present disclosure, the bearings are deep groove ball bearings.

As an improvement of the present disclosure, the two end covers are disposed in relative to each other, and the shapes of the two end covers are roughly the same.

As an improvement of the present disclosure, at least one roller is made of one of wood, rubber, plastics and metal.

As an improvement of the present disclosure, the end covers include main portions and arc portions, and a radius R1 of the circle where the outer surfaces of the rollers are located is greater than a radius R2 of each arc portion.

As an improvement of the present disclosure, the rollers have rubber and/or fabric covering layers.

As an improvement of the present disclosure, the inner walls of the rollers form a hollow cavity.

Beneficial effects: Through the above structure setting, during assembly, the connecting end of the connecting shaft passes through the rotating shaft holes and is connected with the connecting portions, the free end of the connecting shaft abuts against outer surfaces of the end covers, such that the roller assemblies are connected with the end covers, the connecting shaft is only inserted along the rotating shaft holes and connected with the connecting portions due to a small size, with a convenient installation and a high product assembly efficiency; meantime, the product weight can be effectively reduced without setting screws passing through the product, which is convenient for users to use; and when in use, the users hold the product in hands, overturn the product and rotate the roller assemblies, at this time the roller assemblies and the connecting shaft rotate in relative to the end covers, and the users can play the product freely, with a better user experience.

BRIEF DESCRIPTION OF THE DRAWINGS

In order to explain the technical solutions of the embodiments of the present disclosure more clearly, the following will briefly introduce the accompanying drawings used in the embodiments. The drawings in the following description are only some embodiments of the present disclosure. Those of ordinary skill in the art can obtain other drawings based on these drawings without creative work.

The present disclosure is further described below in detail in combination with the accompanying drawings and embodiments.

DETAILED DESCRIPTION OF THE EMBODIMENTS

Figure 1:
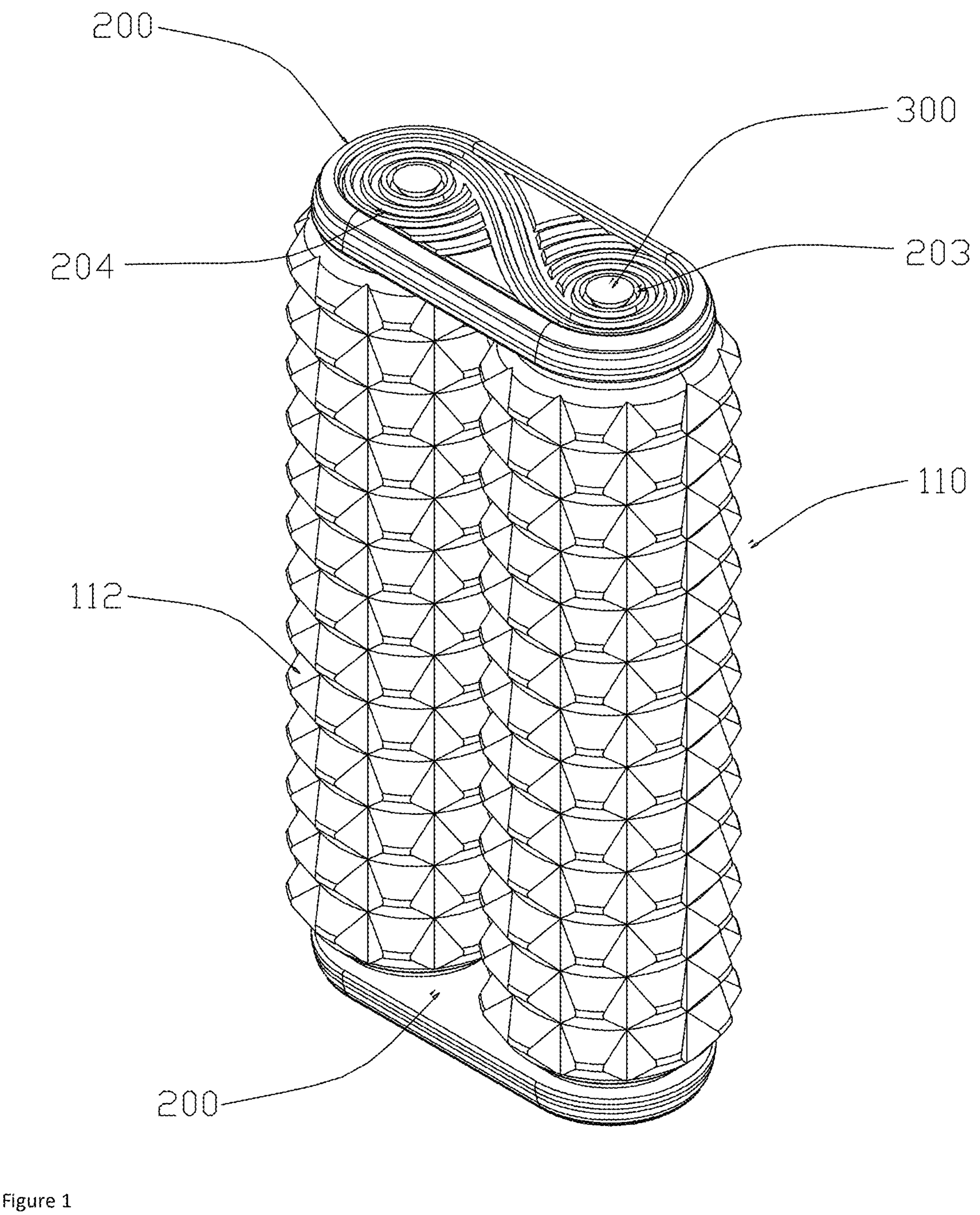
FIG. 1 is a schematic diagram of an overall structure of an angle in the present disclosure.
Figure 2:
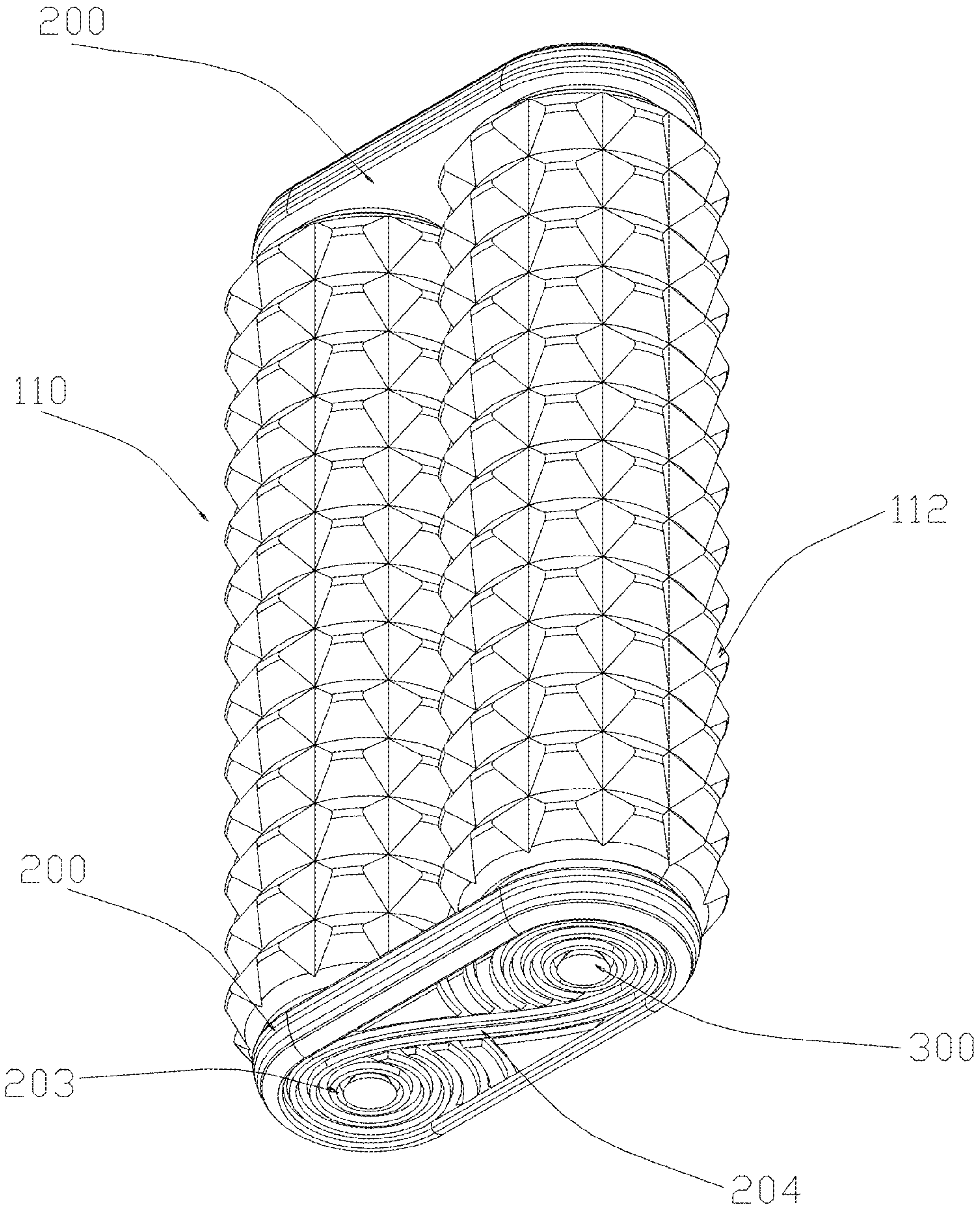
FIG. 2 is a schematic diagram of an overall structure of another angle in the present disclosure.
Figure 3:
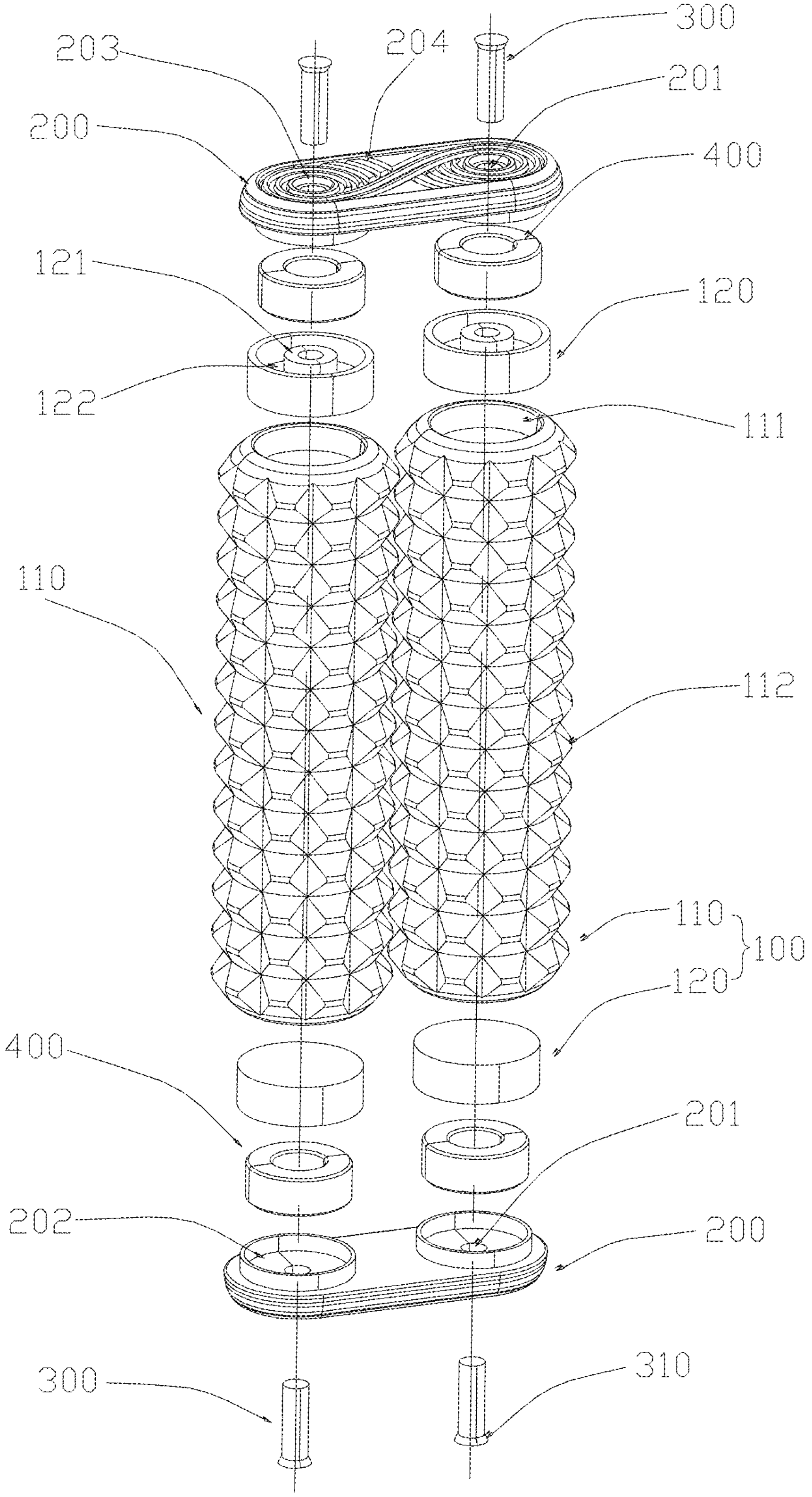
FIG. 3 is a schematic diagram of an exploded structure of an angle in the present disclosure.
Figure 4:
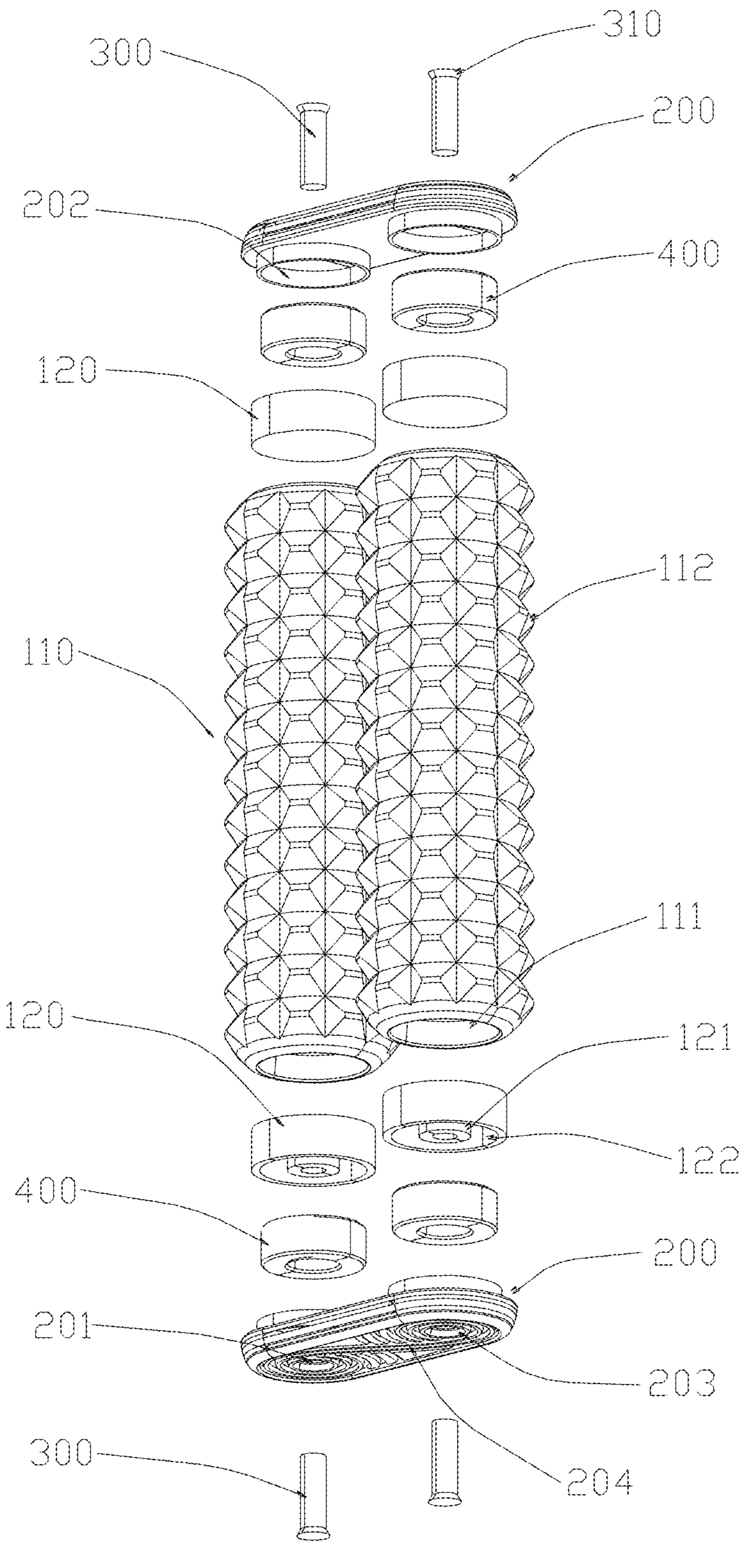
FIG. 4 is a schematic diagram of an exploded structure of another angle in the present disclosure.
Figure 5:
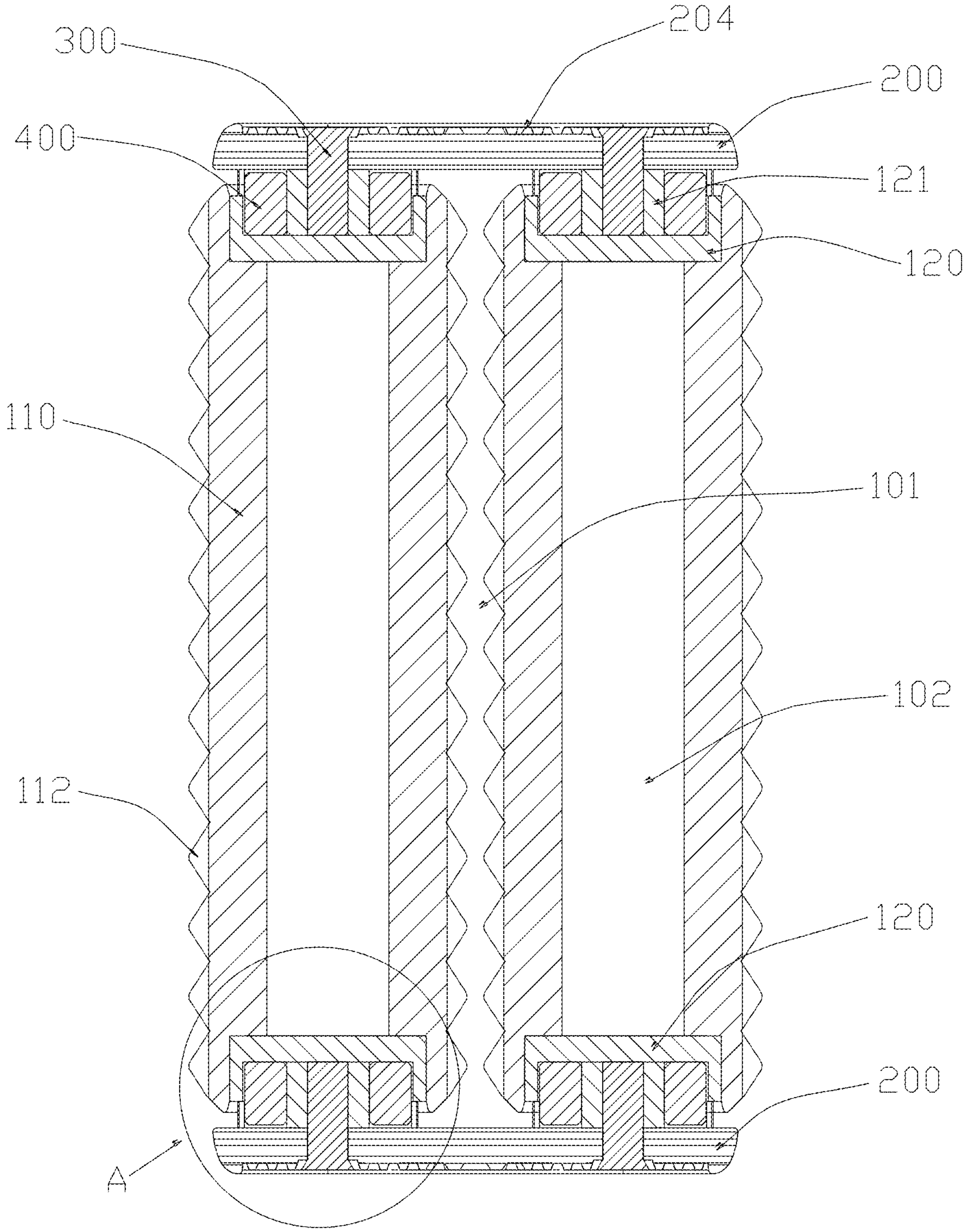
FIG. 5 is a schematic diagram of a sectional structure in the present disclosure.
Figure 6:
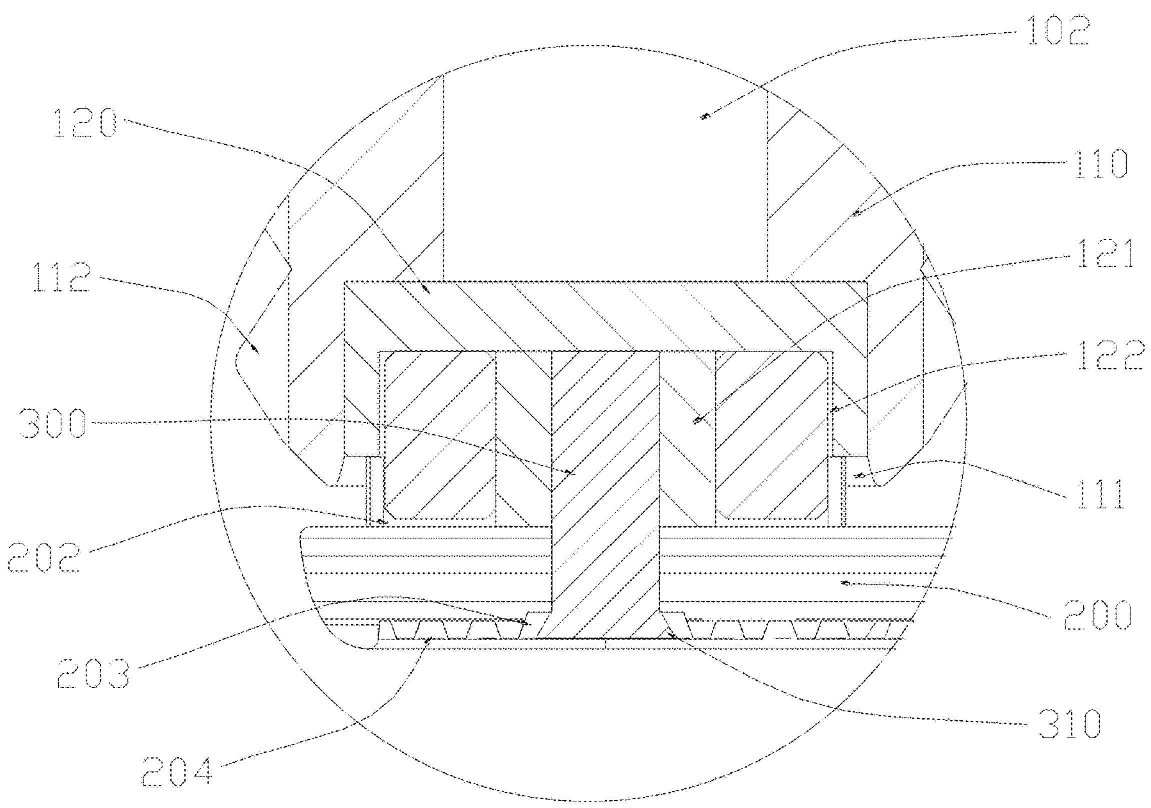
FIG. 6 is an enlarged view of a part A in FIG. 5.
Figure 7:
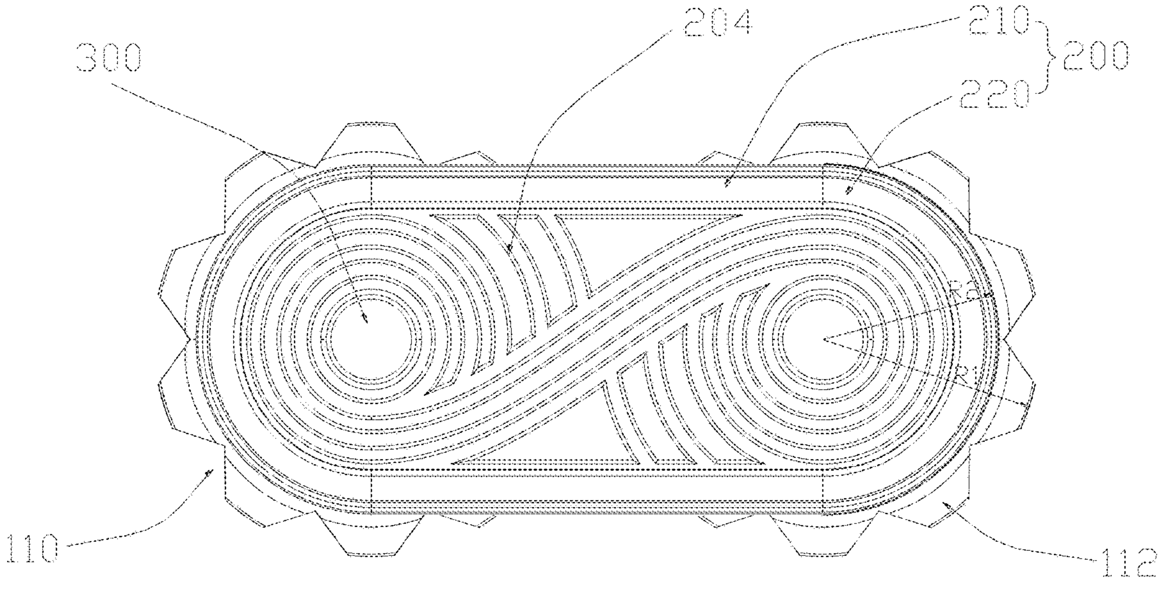
FIG. 7 is a top view of the present disclosure.
Figure 8:
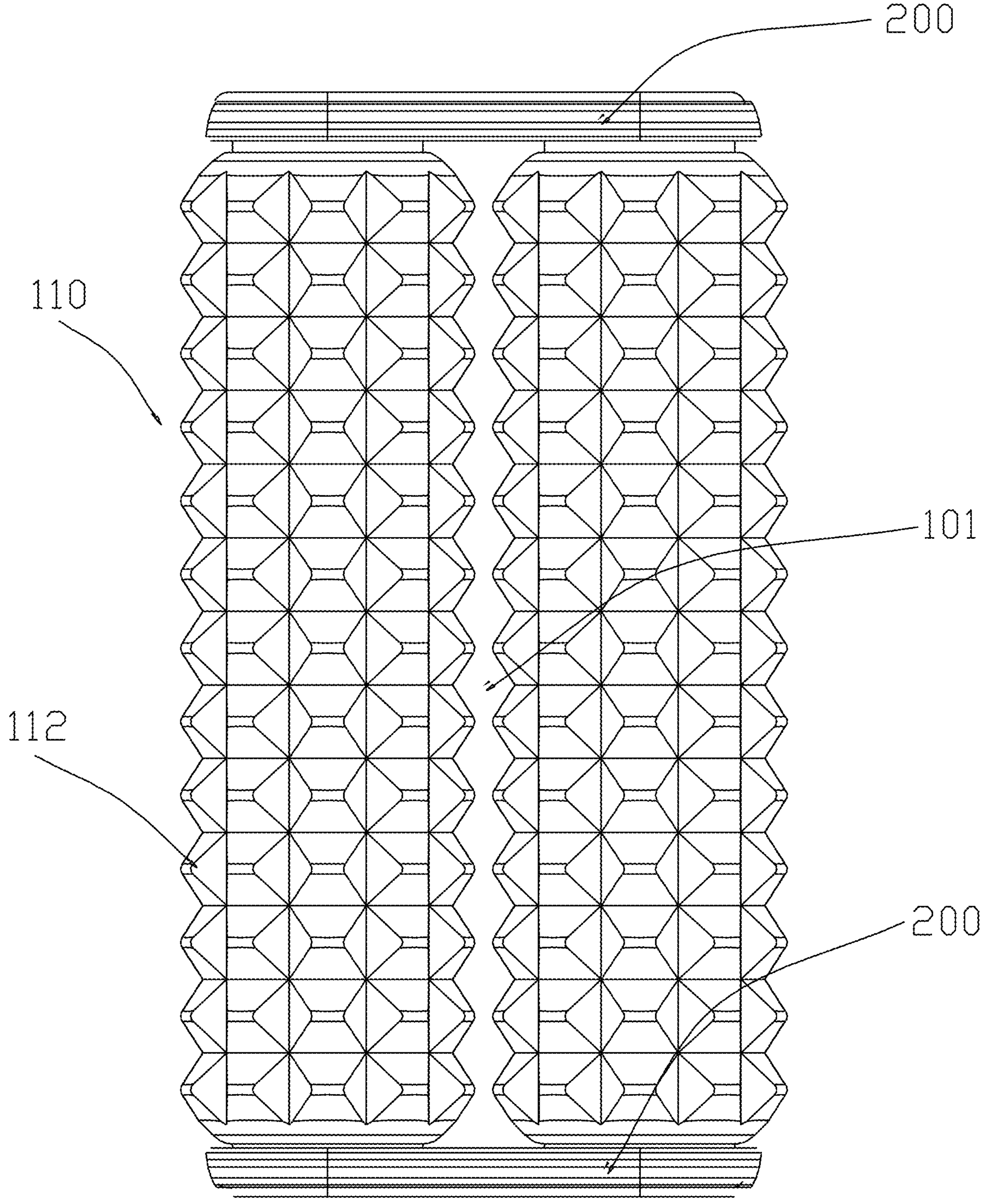
FIG. 8 is a side view of the present disclosure.

With reference to FIGS. 1-8, a handheld roller, including:

at least two roller assemblies 100, where the roller assemblies 100 have first ends and second ends, and the first ends and the second ends of the roller assemblies 100 are both provided with connecting portions 121;

two end covers 200, where the end covers 200 are provided with rotating shaft holes 201, one end cover 200 is covered at the first end of each roller assembly 100, and the other end cover 200 is covered at the second end of each roller assembly 100;

a connecting shaft 300, where a connecting end of the connecting shaft 300 passes through the rotating shaft holes 201 and is connected with the connecting portions 121, a free end of the connecting shaft 300 abuts against the position that the end covers 200 are close to the rotating shaft holes 201, and the connecting shaft 300 and the roller assemblies 100 form a whole; and when the roller assemblies 100 rotate around axes thereof under the drive of an external force, both the roller assemblies 100 and the connecting shaft 300 rotate in relative to the end covers 200.

Through the above structure setting, during assembly, the connecting end of the connecting shaft 300 passes through the rotating shaft holes 201 and is connected with the connecting portions 121, the free end of the connecting shaft 300 abuts against outer surfaces of the end covers 200, such that the roller assemblies 100 are connected with the end covers 200, the connecting shaft 300 is only inserted along the rotating shaft holes 201 and connected with the connecting portions 121 due to a small size, with a convenient installation and a high product assembly efficiency; meantime, the product weight can be effectively reduced without setting screws passing through the product, which is convenient for users to use; and when in use, the users hold the product in hands, overturn the product and rotate the roller assemblies 100, at this time the roller assemblies 100 and the connecting shaft 300 rotate in relative to the end covers 200, and the users can play the product freely, with a better user experience.

In this embodiment, the handheld roller further includes bearings 400, the roller assemblies 100 are provided with bearing grooves 122 that are disposed around the connecting portions 121, the bearings 400 are plugged into the bearing grooves 122, and outer surfaces of the bearings 400 abut against one sides of the end covers 200 that face the roller assemblies 100. Through the above structure setting, when the product is assembled, the bearings 400 are plugged into the bearing grooves 122, the end covers 200 are covered at both ends of the roller assemblies 100, and then the connecting end of the connecting shaft 300 passes through the rotating shaft holes 201 and through holes in the bearings 400 and is connected with the connecting portions 121, that is, the product assembly can be achieved; and meantime, the frictional force between the roller assemblies 100 and the end covers 200 can be reduced due to the setting of the bearings 400, and when the users overturn the product and rotate the roller assemblies 100, the rotation of the roller assemblies 100 can be achieved with a less force, and the users are more convenient and comfortable to use the product.

In this embodiment, the connecting portions 121 extend upward along the through holes in the middles of the bearings 400, and the lengths of the connecting portions 121 are roughly equivalent to the thicknesses of the bearings 400. Through the above structure setting, the lengths of the connecting portions 121 are roughly equivalent to the thicknesses of the bearings 400, so the connecting portions 121 can be completely plugged into the through holes in the middles of the bearings 400, and the connection between the bearings 400 and the connecting portions 121 is more tight and stable, to prevent the roller assemblies 100 deviating from the rotating shafts during rotation, and improve the product stability; meantime the connecting portions 121 are lengthened due to extending upward along the through holes in the middles of the bearings 400, the part of the connecting end of the connecting shaft 300 that is connected with the connecting portions 121 may also be lengthened, which further achieves a more stable connection between the connecting shaft 300 and the connecting portions 121; and at the same time, the connecting portions 121 are lengthened, when the product is assembled, the connecting end of the connecting shaft 300 can be in contact with the connecting portions 121 just after passing through the rotating shaft holes 201, thus reducing the assembly difficulty and improving the product assembly efficiency.

In this embodiment, one sides of the end covers 200 that face the roller assemblies 100 are provided with limiting grooves 202, and upper parts of the bearings 400 are plugged into the limiting grooves 202. Through the above structure setting, during assembly, the upper parts of the bearings 400 are plugged into the limiting grooves 202, which can effectively limit the radial movement of the bearings 400, effectively limit the positions of the bearings 400, and improve the product stability.

In this embodiment, the roller assemblies 100 include rollers 110 and two connectors 120, first ends and second ends of the rollers 100 are both provided with mounting holes 111, the two connectors 120 are mounted in the mounting holes 111 in a manner of interference fit, the connecting shaft 300 is connected with the connectors 120, and both the connecting portions 121 and the bearing grooves 122 are disposed on one sides of the connectors 120 that deviate from the rollers 110. Through the above structure setting, during assembly, the connectors 120 are plugged along the mounting holes 111, and outer surfaces of the connectors 120 are in interference fit with inner walls of the mounting holes 111, to achieve the stable connection between the connectors 120 and the rollers 110; and however the rollers 110 and the connectors 120 are in split design, which can reduce the production difficulty of the product, and improve the production efficiency.

In this embodiment, the connecting end of the connecting shaft 300 is in threaded connection with the connecting portions 121. Through the above structure setting, since the connecting end of the connecting shaft 300 is in threaded connection with the connecting portions 121, on the one hand, the connecting operation is convenient and quick, and on the other hand, the connection is more stable.

In this embodiment, the free end of the connecting shaft 300 is provided with an abutting block 310, one sides of the end covers 200 that are away from the roller assemblies 100 are provided with accommodating grooves 203 along edges of the rotating shaft holes 201, and the abutting block 310 abuts against inner walls of the accommodating grooves 203. Through the above structure setting, when in use, the abutting block 310 is plugged into the accommodating grooves 203, which can effectively limit the radial movement of the abutting block 310 and improve the product stability; and meantime at least part of abutting block 310 can also be concealed, to prevent an edge of the abutting block 310 scratching the users.

In this embodiment, an end face outside the abutting block 310 is roughly flush with end faces outside the end covers 200. Through the above structure setting, the end face outside the abutting block 310 is roughly flush with the end faces outside the end covers 200, which not only can improve the overall beauty of the product, but also prevent the edge of the abutting block 310 scratching the users, thus improving the user experience.

In this embodiment, surfaces of the end faces outside the end covers 200 are provided with convex and concave grains 204. Through the above structure setting, when in use, the users can hold the end faces outside the end covers 200 in hands, the convex and concave grains 204 on the end faces outside the end covers 200 can improve the frictional force, so the users can hold the product more stably; and meantime when placing the product, the end faces outside the end covers 200 are in contact with a desk and other placing planes, the convex and concave grains 204 enable the frictional force between the end faces outside the end covers 200 and the placing planes such as the desk to be greater, and the product is placed more stably.

In this embodiment, a gap 101 is formed between outer surfaces of the two adjacent roller assemblies 100, and a width of the gap 101 is not greater than 1 CM. Through the above structure setting, the width of the gap 101 between the outer surfaces of the two adjacent roller assemblies 100 is not greater than 1 CM, when the users use the product, the roller assemblies 100 will not pinch the users' hands during rotation, thus improving the product safety.

In this embodiment, axes of the two adjacent roller assemblies 100 are roughly parallel to each other. Through the above structure setting, referring to FIGS. 3-4, the axes of various roller assemblies 100 are roughly parallel to each other, and when the users use the product, a plurality of roller assemblies 100 can rotate freely, so the product is more interesting.

In this embodiment, outer surfaces of the rollers 110 are provided with a plurality of bumps 112. Through the above structure setting, when in use, the users hold, overturn the product and rotate the roller assemblies 100, the bumps 112 on the outer surfaces of the rollers 110 can massage the users' palm and fingers, to promote blood circulation, and the users may relax themselves when using the product, thus improving the user experience.

In this embodiment, the bumps 112 are evenly arranged on the surfaces of the rollers 110 along circumferential directions of the rollers 110. Through the above structure setting, the bumps 112 are evenly arranged along the surfaces of the rollers 110, and when users hold, overturn the product and rotate the roller assemblies 100, the bumps 112 are in full contact with the users' hand, to provide the users with massage, and the uses have a better user experience and the product appearance is more beautiful.

In this embodiment, the bearings 400 are deep groove ball bearings. Through the above structure setting, the deep groove ball bearings can effectively reduce friction, the deep groove ball bearings adopt spherical surface contact, the spherical surface contact is the point contact and thus has a relatively low frictional coefficient; and when in use, the roller assemblies 100 can rotate in relative to the end covers 200 more easily, which is convenient for the users to use.

In this embodiment, the two end covers 200 are disposed in relative to each other, and the shapes of the two end covers 200 are roughly the same. Through the above structure setting, the two end covers 200 are disposed in relative to each other, so the product is more stable; and the shapes of the two end covers 200 are roughly the same, so the product is more beautiful.

In this embodiment, at least one roller 110 is made of one of wood, rubber, plastics and metal. This kind of material includes but is not limited to rubber, silicone, wood, plastics, glass and metal, particularly copper, copper-bearing alloy, silver, silver-bearing alloy or other processed antibacterial, antifungal and/or antimicrobial property materials; and this kind of material can effectively inhibit bacteria breeding, and users are more assured and safer to use the product.

In this embodiment, the end covers 200 include main portions 210 and arc portions 220, and a radius R1 of the circle where the outer surfaces of the rollers 110 are located is greater than a radius R2 of each arc portion 220. Through the above structure setting, the radius R1 of the circle where the outer surfaces of the rollers 110 are located is greater than the radius R2 of each arc portion 220 and is also greater than the width of each main portion 210; and when the roller assemblies 100 rotate in relative to the end covers 200, the users' hand can be only in contact with the outer surfaces of the rollers 110 and the outer surfaces of the end covers 200, the edges of the end covers will not scratch the users' hand, so the use is more comfortable and safer.

In this embodiment, the rollers 110 have rubber and/or fabric covering layers. Through the above structure setting, on the one hand, the rubber and/or fabric covering layers covered on the surfaces of the rollers 110 can improve the frictional force between the rollers 110 and the users' hand, facilitating the rotation of the roller assemblies 100 by the users, and on the other hand, can also prolong the service life of the product and protect the product; and preferably, the covering layers are usually made of processed antibacterial, antifungal and/or antimicrobial property rubber or fabrics.

In this embodiment, the inner walls of the rollers 110 form a hollow cavity 102. Through the above structure setting, the rollers 110 are provided the hollow cavity 102, which can effectively reduce the overall weight of the rollers 110, and the users have a better and more comfortable experience when holding and playing the product.

As described above, one or more embodiments are provided in conjunction with the detailed description, The specific implementation of the present disclosure is not confirmed to be limited to that the description is similar to or similar to the method, the structure and the like of the present disclosure, or a plurality of technical deductions or substitutions are made on the premise of the conception of the present disclosure to be regarded as the protection of the present disclosure.

The invention claimed is:

1. A handheld roller, comprising:

at least two roller assemblies, wherein each of the roller assemblies comprises two connectors, and a roller having a first end and an opposite second end, each of the first end and the second end of the roller is provided with a mounting hole, the two connectors are mounted in the mounting holes in a manner of interference fit, each of the connectors comprises an enclosed bottom, a bearing groove and a connecting portion, with the bearing groove being disposed around the connecting portion, and both the connecting portion and the bearing groove extending from one side of the enclosed bottom, away from the rollers;

two end covers, wherein each of the end covers is provided with a plurality of rotating shaft holes corresponding to the roller assemblies, one end cover is covered at the first end of each roller assembly, and the other end cover is covered at the second end of each roller assembly;

a plurality of bearings, wherein each of the bearings is plugged into one of the bearing grooves, and outer surfaces of the bearings abut against one side of the end covers that face the roller assemblies; and a plurality of connecting shafts, wherein each of the connecting shafts comprises a connecting end passing through one of the rotating shaft holes and connected with one of the connecting portions, a free end of the connecting shaft abuts against the end covers, and the connecting shaft and the roller assemblies form a whole;

when the roller assemblies rotate around axes thereof under the drive of an external force, both the roller assemblies and the connecting shaft rotate in relative to the end covers.

2. The handheld roller according to claim 1, wherein the connecting portions extend upward along through holes in the middles of the bearings, and the lengths of the connecting portions are roughly equivalent to the thicknesses of the bearings.

3. The handheld roller according to claim 1, wherein one side of the end covers that face the roller assemblies are provided with limiting grooves, and upper parts of the bearings are plugged into the limiting grooves.

4. The handheld roller according to claim 1, wherein the connecting end of the connecting shaft is in threaded connection with the connecting portions.

5. The handheld roller according to claim 1, wherein the free end of the connecting shaft is provided with an abutting block, and one side of the end covers that are away from the roller assemblies are provided with accommodating grooves along edges of the rotating shaft holes, and the abutting block abuts against inner walls of the accommodating grooves.

6. The handheld roller according to claim 5, wherein an end face outside the abutting block is roughly flush with end faces outside the end covers.

7. The handheld roller according to claim 1, wherein surfaces of the end faces outside the end covers are provided with convex and concave grains.

8. The handheld roller according to claim 1, wherein a gap is formed between outer surfaces of the two adjacent roller assemblies, and a width of the gap is not greater than 1 CM.

9. The handheld roller according to claim 1, wherein axes of the two adjacent roller assemblies are roughly parallel to each other.

10. The handheld roller according to claim 1, wherein outer surfaces of the rollers are provided with a plurality of bumps.

11. The handheld roller according to claim 10, wherein the bumps are evenly arranged on the surfaces of the rollers along circumferential directions of the rollers.

12. The handheld roller according to claim 1, wherein the bearings are deep groove ball bearings.

13. The handheld roller according to claim 1, wherein the two end covers are disposed parallel in relation to each other, and the shapes of the two end covers are the same.

14. The handheld roller according to claim 1, wherein at least one roller is made of one of wood, rubber, plastics and metal.

15. The handheld roller according to claim 1, wherein the end covers comprise main portions and arc portions, and a radius R1 of the circle where the outer surfaces of the rollers are located is greater than a radius R2 of each arc portion.

16. The handheld roller according to claim 1, wherein the rollers have rubber and/or fabric covering layers.

17. The handheld roller according to claim 1, wherein the inner walls of the rollers form a hollow cavity.

* * * * *